F. M. PRATHER.
PACKING JOINT.
APPLICATION FILED JULY 11, 1911.
1,061,633.
Patented May 13, 1913.
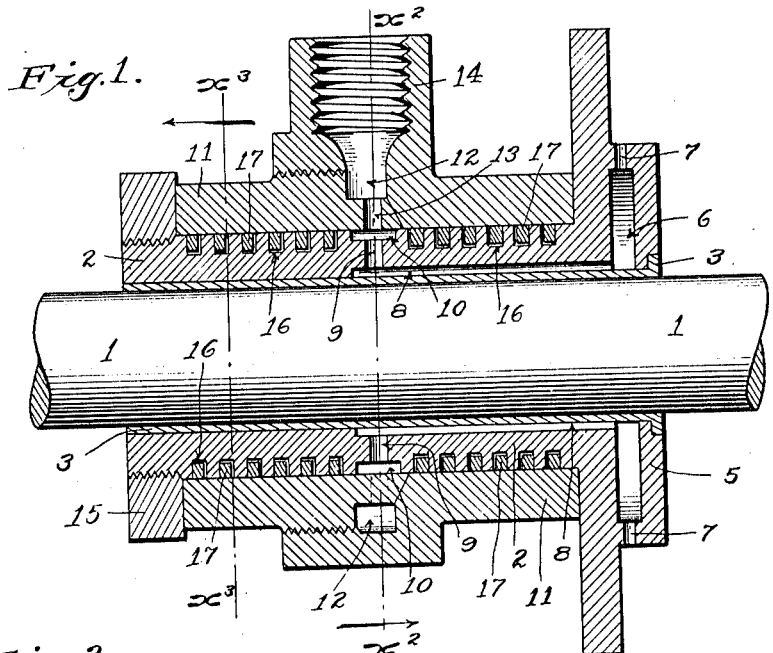
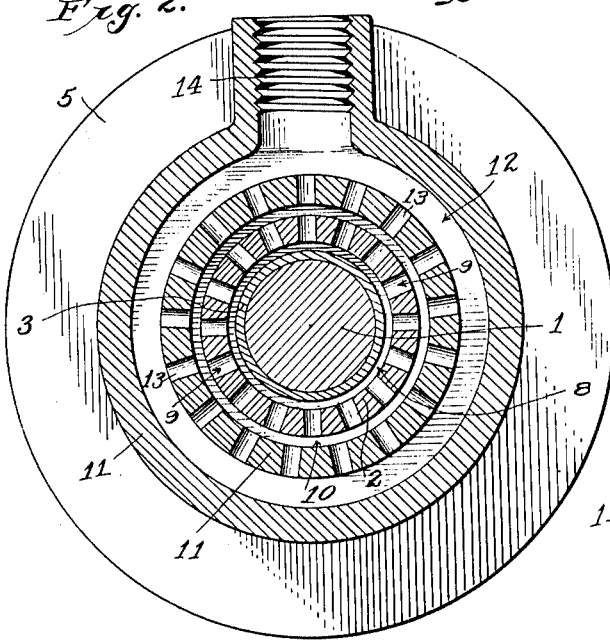
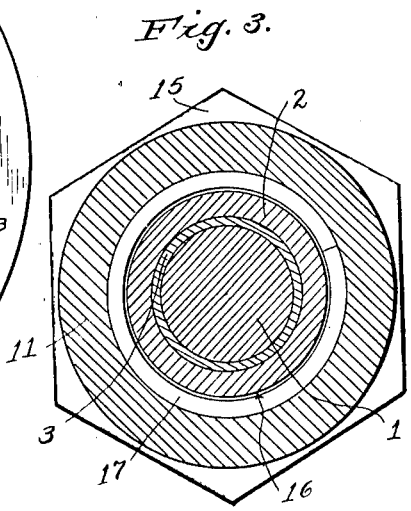
Witnesses:
Inventor:
Frank M. Prather.

UNITED STATES PATENT OFFICE.

FRANK MONROE PRATHER, OF LOS ANGELES, CALIFORNIA.

PACKING-JOINT.

1,061,633.

Specification of Letters Patent.

Patented May 13, 1913.

Application filed July 11, 1911. Serial No. 638,029.

*To all whom it may concern:*

Be it known that I, FRANK M. PRATHER, a citizen of the United States, residing at Los Angeles, in the county of Los Angeles and State of California, have invented a new and useful Packing-Joint, of which the following is a specification.

This invention relates to a packing joint particularly adapted for preventing leakage of air or other fluid which is being conducted from a rotating member to a stationary member.

In a former application of mine on power transmitter, filed April 12th, 1911, Serial No. 620,629, I have shown a hollow shaft into which compressed air is introduced, and the space within the shaft has communication with a hollow stationary ring which receives air from the shaft under certain conditions, and which under other conditions, supplies air to the shaft. The difficulty experienced with devices of this character is that air escapes at the joint between the rotating member and stationary member, and the main object of the present invention is to prevent this.

A further object of the invention is to so construct the air passages between the stationary and rotating member that the rotation of the rotating member will not cause a marked variation in the size of the air passages so that during the rotation of this member the flow of air in either direction will be uniform.

Referring to the drawings: Figure 1 is a vertical section through the invention. Fig. 2 is a section on line $x^2$—$x^2$ Fig. 1. Fig. 3 is a section on line $x^3$—$x^3$ Fig. 1.

1 designates the rotatable shaft to which is fixed a sleeve 2 which rotates therewith, the sleeve 2 being secured by a Babbitt bushing 3. In one end of the sleeve 2 is a hollow head 5 forming an annular chamber 6 which is provided with a plurality of air passages 7 which may be connected with the cylinders or any other thing which is to receive the air. The sleeve 2 may be considered as a part of the shaft 1 as it forms virtually a part thereof and is made separate therefrom. The sleeve 2 is formed with an annular air chamber 8 at one end and communicates with the air chamber 6 and at the other end communicates with a series of radial air passages 9, formed in the sleeve 2, there being a central narrow annular air passage 10 formed in the sleeve 2, and the passages 9 extend between the annular passage 10 and annular passage 8.

Surrounding the sleeve 2 is a stationary sleeve 11 which is preferably formed of two male and female parts, as shown, screwed together and permanently secured to form virtually one member as they are not separated if once joined. The sleeve 11 is provided with an annular air passage 12 which communicates with a series of radial air passages 13 also formed therein and extending to the annular passage 10 of the sleeve and communicating therewith. The sleeve 11 has an internally threaded lug 14 adapted for the attachment of an air conducting pipe not shown, and communicates with the annular air passage 12. A ring 15 is screwed to the sleeve 2 and retains the sleeve 11.

The sleeve 2 is provided with a series of annular grooves 16 which contain packing rings 17. The rings 17 are split and are known as piston rings.

The rings 17 expand and grip the internal wall of the stationary sleeve 11 so that the rings 17 do not revolve, while the sleeve 2 revolves around the rings. The air in passing, for example, from the stationary sleeve 11 enters through the radial passages 13 into the annular passage 10 and thence through the radial passages 9 into the annular passage 8, thence into the chamber 6 and out through the passages 7.

The air within the annular chamber 10 works along the crack between the sleeves 2 and 11 and encounters the packing rings 17, which being expanded and in stationary contact with the outer ring 11 prevent the air from passing forth and the pressure of the air forces the rings outward longitudinally of the shaft 1 so that referring to Fig. 1, those rings at the left of the passage 10 are forced by the air against the left walls of the grooves 16, while those rings at the right of the passage 10 are forced by the compressed air against the right walls of the grooves 16. This effectually seals the joint and prevents the escape of compressed air. If air passes in the other direction from the chamber 6, passage 8, passages 9, and passage 10 to the passages 13, the action is the same.

By reference to Fig. 2 it will be seen that I use a different number of passages 9 from that of the passages 13, in the present instance employing sixteen passages 9 and seventeen passages 13. The object of this is to produce uniformity in the flow of air by maintaining a substantially uniform area of air passage. Thus if there were to be sixteen passages 9 and sixteen passages 13, they would alternately all simultaneously be in communication with each other and then shut off from each other. This would produce an intermittent or pulsating effect of the air which I avoid by the present construction, as with the ratio in number of passages shown, there are always a certain number of passages in communication. I further produce uniformity of flow by introducing the annular passage 10, which acts in the manner of a small reservoir and also serves to prevent any sharp cut off between the passages 9 and 13.

What I claim is:

1. A rotating member, a stationary member, radially elastic packing rings carried by one of said members and exerting a radial pressure against the other member, the said members having passages which communicate, said rings being arranged in two sets on opposite sides of said passages.

2. A stationary member, a rotating member therein, the rotating member having a series of annular grooves, packing rings in said grooves in intimate contact with the stationary member, the said rotating member operating to move its grooves around the stationary rings, the said members having air passages which communicate, said passages being located between said rings, thereby causing the rings to be forced in opposite directions by fluid from said passages.

3. A rotating member, a stationary member, stationary packing rings engaging the inner walls of the stationary member, the rotating member having annular grooves which receive said stationary packing rings, the stationary member and the rotating member each having a series of radial air passages there being more passages in one member than in the other.

4. A rotating member, a stationary member, stationary packing rings engaging the inner walls of the stationary member, the rotating member having annular grooves which receive said stationary packing rings, the stationary member and the rotating member each having a series of radial air passages there being more passages in one member than in the other, one of said members having an annular passage which communicates with the radial passages in that member and with the radial passages in the other member.

5. A rotating member, a stationary member, said members having passages which communicate, and radially expansive packing rings between said members and arranged in two sets on opposite sides of said passages.

In testimony whereof, I have hereunto set my hand at Los Angeles, California, this 5th day of July, 1911.

FRANK MONROE PRATHER.

In presence of—
G. T. HACKLEY,
GLADYS RUSSELL.